US012472502B2

(12) United States Patent
Brassard et al.

(10) Patent No.: US 12,472,502 B2
(45) Date of Patent: Nov. 18, 2025

(54) OIL RESIDUE PROTECTION IN OIL-ENCAPSULATED DIGITAL MICROFLUIDICS

(71) Applicant: National Research Council of Canada, Ottawa (CA)

(72) Inventors: Daniel Brassard, Longueuil (CA); Lidija Malic, Saint Leonard (CA); Keith Morton, St-Bruno (CA); Teodor Veres, Montreal (CA)

(73) Assignee: National Research Council of Canada, Ottawa (CA)

( * ) Notice: Subject to any disclaimer, the term of this patent is extended or adjusted under 35 U.S.C. 154(b) by 831 days.

(21) Appl. No.: 17/618,037

(22) PCT Filed: Jul. 9, 2020

(86) PCT No.: PCT/IB2020/056483
§ 371 (c)(1),
(2) Date: Dec. 10, 2021

(87) PCT Pub. No.: WO2021/005560
PCT Pub. Date: Jan. 14, 2021

(65) Prior Publication Data

US 2022/0274112 A1 Sep. 1, 2022

Related U.S. Application Data

(60) Provisional application No. 62/872,374, filed on Jul. 10, 2019.

(51) Int. Cl.
*B01L 3/00* (2006.01)

(52) U.S. Cl.
CPC ... *B01L 3/502792* (2013.01); *B01L 2200/141* (2013.01); *B01L 2300/0645* (2013.01); *B01L 2300/161* (2013.01); *B01L 2400/0427* (2013.01)

(58) Field of Classification Search
CPC ......... B01L 3/502792; B01L 2200/141; B01L 2300/0645; B01L 2300/161;
(Continued)

(56) References Cited

U.S. PATENT DOCUMENTS

| | | | |
|---|---|---|---|
| 8,845,872 | B2 | 9/2014 | Pollack et al. |
| 9,125,603 | B2 | 9/2015 | Galasso |

(Continued)

FOREIGN PATENT DOCUMENTS

| | | | |
|---|---|---|---|
| JP | 2006329904 | * | 12/2006 |
| JP | 2006329904 | A | 12/2006 |

(Continued)

OTHER PUBLICATIONS

Ehsan Samiei, George S. Luka, Homayoun Najjaran, Mina Hoorfar; Integration of biosensors into digital microfluidics: Impact of hydrophilic surface of biosensors on droplet manipulation; Univeristy of British Columbia, Biosensors and Bioelectronoics 81 (2016) 480-486.

(Continued)

*Primary Examiner* — Jill A Warden
*Assistant Examiner* — Jacqueline Brazin
(74) *Attorney, Agent, or Firm* — Jason E. J. Davis

(57) ABSTRACT

A technique for supplying droplet content of an oil-encapsulated (OE) digital microfluidic (DμF) network to a region that is sensitive to oil contact involves sealing off a boundary surrounding the sensitive region with a volume of liquid that is miscible with payload of the OE-droplets. The sensitive region may be an opening to a microfluidic channel, or a sensor surface. The sealing off may be provided by transporting an unencapsulated droplet over the OE-DμF chip, either from a reservoir prior to oil encapsulation of the reservoir, or from a non-oil encapsulated reservoir; or by injecting the liquid into the microfluidic channel. A suitable treatment of the boundary may anchor the liquid to the (Continued)

boundary, and prevent removal by ordinary OE-DμF operations. A remainder of the surfaces of unit cells the DμF chip may provide higher droplet contact angle.

20 Claims, 4 Drawing Sheets

(58) Field of Classification Search
CPC ..... B01L 2400/0427; B01L 2200/0673; B01L 2300/0636; B01L 2300/0663; B01L 2300/0816
USPC .......................................................... 422/502
See application file for complete search history.

(56) References Cited

U.S. PATENT DOCUMENTS

| | | | | |
|---|---|---|---|---|
| 9,140,635 | B2 | 9/2015 | Graham et al. | |
| 9,156,010 | B2 | 10/2015 | Colston, Jr. et al. | |
| 9,328,344 | B2 | 5/2016 | Link et al. | |
| 9,410,873 | B2 | 8/2016 | Wilson et al. | |
| 9,625,378 | B2 | 4/2017 | Marshall et al. | |
| 2004/0058450 | A1* | 3/2004 | Pamula | B01L 3/502792 436/52 |
| 2010/0291578 | A1* | 11/2010 | Pollack | B01L 3/502792 435/6.11 |
| 2012/0244043 | A1 | 9/2012 | Leblanc et al. | |
| 2014/0073514 | A1 | 3/2014 | Shen et al. | |
| 2015/0205272 | A1* | 7/2015 | Yi | G01N 27/453 204/450 |
| 2015/0377831 | A1 | 12/2015 | Wheeler et al. | |
| 2016/0199832 | A1 | 7/2016 | Jamshidi et al. | |
| 2019/0218594 | A1* | 7/2019 | Abate | C12Q 1/6818 |

FOREIGN PATENT DOCUMENTS

| | | | |
|---|---|---|---|
| WO | 2007120241 | A2 | 10/2007 |
| WO | 2008098236 | A2 | 8/2008 |
| WO | 2008101348 | A1 | 8/2008 |
| WO | 2012122628 | A1 | 9/2012 |
| WO | 2014015984 | A1 | 1/2014 |
| WO | 2017011819 | A1 | 1/2017 |

OTHER PUBLICATIONS

Jiale Yong, Feng Chen, Qing Yang, Jinglan Huo and Xun Hou; Superoleophobic Surfaces, Chem Soc Rev, Chemical Society Reviews; vol. 46, No. 14, Jul. 21, 2017, pp. 4168-4217.

L. Malic, D. Brassard, T. Veres, and M. Tabrizian, “Integration and detection of biochemical assays in digital microfluidic LOC devices,. ” Lab Chip, vol. 10, No. 4, pp. 418-431, Feb. 2010.

K. Choi A. H. C. Ng, R. Fobel, and A. R. Wheeler, “Digital Microfluidics,” Annu. Rev. Anal. Chem., vol. 5, No. 1, p. 413-440, Jul. 2012.

E. Samiei, M. Tabrizian, and M. Hoorfar, “A review of digital microfludiics as portable platforms for lab-on a-chip applications,” Lap Chip, vol. 16. No. 13. pp. 2376-2396, 2016.

R. B. Fair, “Digital microfluidics; is a true lab-on-a-chip possible?,” Microfluid. Nanofluidics, vol. 3, No. 3, pp. 245-281, Mar. 2007.

L. Malic, T. Veres, and M. Tabrizian, “Two-dimensional droplet-based surface plasmon resonance imaging using electrowetting-on-dielectric microfluidics.,” Lab Chip, vol. 9, No. 3, pp. 473-475, Mar. 2009.

L. Malic, T. Veres, and M. Tabrizian, “ Biochip functionalization using electrowetting-on-dielectric digital microfluidics for surface plasmon resonance imaging detection of DNA hydridization., ” Biosens. Bioelectron., vol. 24, No. 7, pp. 2218-2224, Mar. 2009.

L. Malic, T. Veres, and M. Tabrizian, “Nanostructured digital microfluidics for enhanced surface plasmon resonance imaging,. ” Biosens. Bioelectron., vol. 26, No. 5, pp. 2053-2059, Jan. 2011.

P. Dubois, G. Marchand, Y. Fouillet, J. Berthier, T. Douki, F. Hassine, S. Gmouh, and M. Vaultier, “Ionic liquid droplet as e-microreactor.,” Anal. Chem., vol. 78, No. 14, pp. 4909-4917, 2006.

D. Brassard, L. Malic, F. Normandin, M. Tabrizian, and T. Veres, “Water-oil core-shell, droplets afor electrowetting-based digital microfluidic devices,” Lab Chip, vol. 8, No. 8, p. 1342, 2008.

V. Srinivasan, V. K. Pamula, and R. B. Fair, “An integreated digital microfluidic lab-on-a-chip for clinical diagnostics on human physiological fluidis, ” Lab Chip, vol. 4, No. 4, p. 310, 2004.

A. M. Foudeh, D. Brassard, M. Tabrizian, and T. Veres, “Rapid and multiplex detection of legionella’s RNA using digital microfluidics, ” Lab Chip, vol. 15, No. 6, pp. 1609-1618, 2015.

D. Brassard, L. Malic, C. Miville-Godin, F. Normandin, and T. Veres, “Advanced EWOD-based digital microfluidic system for multiplexed analysis of biomolecular interactions,” in 2011 IEEE 24th International Conference on Micro Electro Mechanical Systems, 2011, pp. 153-156.

R.Sista, Z. Hua, P. Thwar, A. Sudarsan, V. Srinivasan, A. Eckhardt, M. Pollack, and V. Pamula, “Development of a digital microfluidic platform for point of care testing., ” Lab on a Chip, vol. 8, No. 12, pp. 2091-2104, 2008.

JP2006329904A—Machine Translation.

* cited by examiner

State 1 (isometric view)

State 2 (top view)

State 3

OIL RESIDUE PROTECTION IN OIL-ENCAPSULATED DIGITAL MICROFLUIDICS

This application is a national phase entry of International Application PCT/IB2020/056483 filed on 9 Jul. 2020 and claims the benefit of U.S. Provisional Patent Application 62/872,374 filed on 10 Jul. 2019, the entire contents of both of which are herein incorporated by reference.

FIELD OF THE INVENTION

The present invention pertains to digital microfluidics using oil encapsulated (OE) air medium, and concerns a technique for preventing oil contamination at sensitive regions of a digital microfluidic chip otherwise liable to fouling by oil residue.

BACKGROUND OF THE INVENTION

Digital microfluidics (DμF) is a technological space providing for manipulation of droplets across a surface of a chip that is divided into unit cells. Unlike other microfluidic systems, the chips need no channels defined within them to guide transport; instead each droplet's surface tension ensures discretization, and cell actuation directs droplet motion. There are many advantages of DμF systems, including: high speed complex processing by virtue of parallel processing of small volume samples; high throughput for complex protocols; integrated sensors and thermal, electric, magnetic or optical processing stations; parsimonious sampling; excellent control over droplet movements; and high system reconfigurability.

There are several variants of DμF systems, defined by a medium surrounding the droplets. It is well known in the art that different immiscible (non-conducting) media can be used to fill an open or closed volume above the surface, in different DμF systems. While air is naturally be the easiest to employ, there are problems with using air media for droplet transport, including that droplet content may evaporate or otherwise react in air, leading to concentration variations in the droplet, and possibly precipitation. As such some droplets lack stability and integrity that is required for certain applications. Furthermore, higher contact line friction forces, particularly of aqueous droplets, reduce reliability and speed of droplet operations in air. Herein aqueous droplets are intended to refer to any homogeneous or heterogeneous liquid base with more water content than any other liquid; the liquid base may optionally carry, suspend, dissolve, or be otherwise laden with particles, cells, or biological material, for example. DμF droplets may be aqueous, or of various other compositions useful for DμF microreactor applications. Those of skill in the art are familiar with the range of droplet compositions (hydrocarbons, solvents, reaction media) that are known to exhibit field effect displacement of in DμF systems (herein "DμF droplet compositions"). Other gasses have been suggested for use as media, but other gas-media do little to inhibit evaporation or outgassing of volatiles from sample droplets.

Furthermore, unintended cross-contamination of droplets can result from transference onto the surface or surfaces of the DμF chip. For example, biomolecules in aqueous droplets can attach to hydrophobic surfaces of the DμF chip, and can degrade or even prevent basic operations such as transportation from one cell to another. Biofouling has been found to be significantly higher in air-medium than in an oil medium. (see V. Srinivasan, V. K. Pamula, and R. B. Fair, "An integrated digital microfluidic lab-on-a-chip for clinical diagnostics on human physiological fluids," Lab Chip, vol. 4, no. 4, p. 310, 2004). This complicates DμF operations with droplets containing hydrophobic molecules such as enzymes, proteins and lipids.

Accordingly, oil, such as mineral and silicone oils, are by far the most used medium for DμF. Some oils have desirable effects on droplet surface tension, low viscosity, and high immiscibility with broad classes of droplet materials. Oil-media not only reduces voltages needed for actuation, but also typically lowers surface tension (surface tension between the droplet and oil is lower than that with air), which facilitates various DμF operations such as splitting and dispensing. Oil-media largely prevents droplet evaporation, enables operation at higher temperatures (as is required for PCR), and has proven to be effective at reducing cross-contamination of samples.

Despite these advantages, the oil-medium DμF requires a fillable enclosure mechanism for retaining the oil (usually with a microfluidic network of oil ports and air vents that are non-intersecting with supplies of buffer, samples, and reagents, etc.), as well as sometimes fussy and complicated processes for filling the enclosure with oil, and removing air bubbles. Moreover, oil-medium DμF is sluggish. Viscous resistance and inertia of the oil medium that must be displaced to let the droplet move, tends to limit droplet displacement rates, which end up limiting possible higher speed protocols.

Noting these advantages and disadvantages of oil- and air-medium DμF, some inventors of the present application proposed, in a paper entitled "Water-oil core-shell droplets for electrowetting-based digital microfluidic devices" Lab Chip, vol. 8, no. 8, p. 1342, 2008, taught a technique that combines the advantages of both. Herein oil-encapsulated (OE-)DμF refers to DμF with a gaseous medium, but where the droplets have oil shells. Each droplet is an independently movable contained fluid payload, covered by its own oil-shell. This has the advantages of oil-medium DμF (lower voltage thresholds, reduced interfacial tension and improved droplet stability and integrity); as well as the advantages of air-medium DμF (simpler chips, avoiding oil filling, and lower drag). The oil shell is expected to further reduce drag on the droplets in comparison with unencapsulated droplets, because of a much higher contact line friction from the air—DμF droplet composition interface than air—oil, or DμF droplet composition—oil interfaces (as explained in the paper). While oil is not a perfectly inert substance, and absorption of gasses and other interactions with the core droplet may still occur, any species or particle that enters the shell has a barrier to overcome before exiting the shell, reducing transference, unlike oil-medium DμF which provide a single continuous (diffusing) medium between the droplets. As such, many transference mechanisms are precluded by OE-DμF.

Also for this reason, OE-DμF makes it possible to transport and manipulate analytes dissolved in the oil phase rather than in the payload. This opens up the possibility of using DMF devices to work on hydrophobic species insoluble in payloads. The oil may be an inert encapsulation, or used for retention or processing of hydrophobic analytes extracted from the payload.

Despite the advantages of OE-DμF, problems remain for some applications. Specifically, the 3 component air, oil, payload may lead to issues regarding streaks or smears of oil that may be left behind by a droplet passing across unit cells. While transference of these streaks may pose a negligible risk for cross-contamination, or may be otherwise mitigated (oil residue left on certain surfaces may be treated or cleaned by a droplet thereon), residue renders some processes inoperable, unreliable, or otherwise problematic. For example, a sensor, especially one that uses surface phenomena (e.g. surface plasmon resonance, electrochemical measurements, or an optical energy supply that is supposed to heat the droplet to within a narrow range of temperatures), may fail if oil disturbs the interface between the droplet and surface. A thin oil film on the sensor surface may prevent analyte molecules from reaching the sensing surface (as explained in E. Samiei, M. Tabrizian, and M. Hoorfar, "A review of digital microfluidics as portable platforms for lab-on a-chip applications," Lab Chip, vol. 16, no. 13, pp. 2376-2396, 2016), causing arbitrary (uncompensatable) changes in measurements. Small volume oil streaks trapped on the sensing surface, may cause unpredictable noise in signal readout.

The problem with supplying de-encapsulated droplet to a sensor or other surface on a DμF chip is made difficult by the encapsulation itself. Before an OE droplet even arrives at a unit cell, a leading edge of oil shell comes in contact with the surface. While it may be possible to evaporate, or otherwise remove oil shells at one unit cell prior to delivery to an adjacent unit cell, this might be a challenging process, and would require a very restricted class of oil be used for the shells. Such a process might require: onerous heat and ventilation controls to remove oil-gas while avoiding condensation of the oil-gas on sensitive surfaces; a lot of time relative to most DμF processes; multiple different oil encapsulation systems; and some efforts to ensure that the oil removal is complete, without the droplet losing to evaporation so much payload that DμF processes, such as movement to an adjacent unit cell, is impeded, or the droplet is otherwise dried or affected. Thus, despite the important advantages of the OE-DμF technique, as well as, oil-medium DμFs, the need for such sensitive regions in DμF has relegated an important class of processes to air-medium DμF.

Indeed, because of the considerable difficulties with DMF devices in air, assays relying on surface interactions have been limited to proof-of-concept demonstrations with relatively simple droplet displacement protocols, that don't dry out droplets (see L. Malic, T. Veres, and M. Tabrizian, "Two-dimensional droplet-based surface plasmon resonance imaging using electrowetting-on-dielectric microfluidics" Lab Chip, vol. 9, no. 3, pp. 473-5, March 2009; L. Malic, M. Tabrizian, T. Veres, B. Cui, and F. Normandin, "System and method for surface plasmon resonance based detection of molecules" WO 2008/101348; L. Malic, T. Veres, and M. Tabrizian, "Biochjp functionalization using electrowetting-on-dielectric digital microfluidics for surface plasmon resonance imaging detection of DNA hybridization" Biosens. Bioelectron, vol. 24, no. 7, pp. 2218-24, March 2009; L. Malic, T. Veres, and M. Tabrizian, "Nanostructured digital microfluidics for enhanced surface plasmon resonance imaging" Biosens. Bioeleclron. vol. 26, no. 5, pp. 2053-9, January 2011; P. Dubois, G. Marchand, Y. Fouillet, J. Berthier, T. Dould, F. Hassine, S. Gmouh, and M. Vaultier, "Ionic liquid droplet as e-microreactor.," Anal. Chem., vol. 78, no. 14, pp. 4909-17, 2006).

A patent disclosure to Advanced Liquid Logic and Duke University (WO 2007/120241 to Pollack et al.) teach air- and oil-medium DμF, as well as OE-DμF, and also teach sensors of various kinds (8.11), including specifically sensors that require very high quality clean surfaces such as SPR (8.11.3.3), but do not teach or explain how to avoid defects resulting from oil-streaked surfaces. While a cleaning solution can be applied over unit cells before and after an OE droplet passes, you cannot clean the surface between when the oil shell crosses the surface and the droplet supporting the shell enters the surface. Thus it can be inferred that oil-medium and OE-DμF operations are not envisaged for use with these sensor surfaces, although it is unstated.

Accordingly analyte detection in DμF is often performed by monitoring a change in the property of a droplet with emphasis on bulk properties. For example, detection can be achieved by measuring the optical absorbance of the droplets, their fluorescence, or chemiluminescence. As the detection is not performed on a surface, the assays can then be performed despite interference from the oil phase. Avoiding surface-based sensing techniques such as surface plasmon resonance (SPR) is an unwanted limitation. Some common techniques call for tedious work to stain samples. Advantages of surface based-sensing techniques such as SPR include the possibility to monitor kinetics of target species absorption in real time. For example, a SPR imaging (SPRi) system has been coupled with digital microfluidic devices for the detection of DNA hybridization. All the droplet operations were performed in air to avoid contamination of the sensing surface integrated on-chip. In another example, electrochemical sensors were embedded in a DMF device. All the operations were also performed in air without the presence of oil. In both examples, the digital microfluidic devices, and the droplet displacement processes are, forcibly, very short and simple. To avoid evaporation, a time from droplet introduction to assay is kept short.

Even if other bulk property sensors and devices can operate with an unknown or changing oil film or streak on a surface, higher accuracy or lower cost equipment, or faster acquisition/operation, may be enabled by keeping the surface oil-free. Furthermore lower cost, label-free, or higher sensitivity methods can alternatively be used, if protected.

Finally, while oil-encapsulation may be beneficial for complex, many step, DμF processes on droplets, it may be beneficial to deliver the droplets to a non-encapsulated environment for other processes (crystallization, precipitation, evaporation, vaporization, or processing at a temperature or ambience inconvenient for DμF), or for delivering the droplet payload to a different fluid handling device, such as an analog microfluidic chip.

Accordingly a need remains for an OE-DμF technique for de-encapsulating droplets to protect sensitive regions of the chip from oil streak or contamination, and allowing for the transport of droplet content to the surfaces. The core droplet content needs to be separable from the shell for many processes, and doing so in a cost, chip space, and energy efficient manner is a need in this art, especially if done without complicating manufacture of the chip or performance of DμF operations.

SUMMARY OF THE INVENTION

Applicant has discovered how to protect sensitive regions of OE-DμF chips from oil, without requiring elaborate equipment, or modification to chip design, and without appreciably slowing down OE-DμF operations. Herein an OE-DμF chip or network is understood to be a DμF chip or network adapted for OE-DμF operations, and as such may be identical to any other DμF chip, or may differ from an oil-medium DμF chip in that it has no filling enclosure system with a bleed valve, or mechanism for avoiding air bubbles, and may differ from an air- or oil-medium DμF chip/network in terms of the voltages applied for droplet movement, or in that it may have a reservoir with separate sample and oil regions as explained herein below in respect of FIG. 10.

The solution involves sealing off an area surrounding the sensitive region(s) with a volume of covering liquid that is miscible with DμF droplet composition of payloads. If the DμF droplet composition of the payloads is aqueous, preferably the covering liquid is a non-sample aqueous droplet such as a purified, deionized or distilled water, or a clean buffer available on-chip; or an aqueous sample having particular value as a calibration sample for a particular sensor of the sensitive region. Alternatively the covering liquid may be a solute, or a solvent for the DμF droplet composition. The sealing off may be provided by transporting an unencapsulated droplet composed of the covering liquid over the OE-DμF chip, either from a reservoir prior to oil encapsulation of the reservoir, or from a non-oil encapsulated reservoir; or by injection of the covering liquid into a separate channel with an opening surrounded by, or adjacent to, the sealing area.

By delivering OE-droplets adjacent to the covering droplet, the oil shell of the OE-droplets naturally surrounds the covering droplet, but are blocked at a seal at the boundary, preventing contact of the oil with the sensitive region. Accordingly, a sequence of OE-droplets can be delivered to the surface by diffusion within the merged droplet, and removed either through the separate channel or subsequent OE-DμF operations to provide concentration changes to the sample on the surface at different time steps, without risk of oil contacting the sensitive region.

This method may impart either of two structural features to a digital microfluidic (DμF) network. By providing the boundary with a low contact angle with the intended fluid, the covering droplet may be anchored to the boundary, precluding or reducing risks of the droplet being removed by DμF operations. By providing an oil wicking material adjacent to a sensitive region that consumes or withdraws the covering droplet and payloads of oil-encapsulated (OE) droplets, excess oil shells of the OE droplets can be removed from the vicinity of the sensitive region.

Accordingly, a process for supplying a payload of an OE droplet to a sensitive region of a DμF network is provided. The process involves providing a DμF network with at least 3 edge-connected unit cells, each unit cell having a volume for containing a droplet of fluid of volume less than 0.1 mL; and a supply for the network adapted to discretize a substantially liquid content of a reservoir into OE droplets, by moving the OE droplets into one of the unit cells. The sensitive region lies entirely within the volume of a first of the unit cells, and is surrounded by a boundary extending continuously around it. The method involves delivering to the first unit cell sufficient oil-free fluid to cover and seal off the boundary, covering the sensitive region, the fluid being miscible with the payload. While the oil-free fluid seals the boundary, the method involves delivering at least one OE droplet from the supply to the first unit cell via the network, and allowing the OE droplet to merge with the oil-free fluid to produce a merged droplet that is surrounded by oil up to, and not including the boundary. As such the sensitive region is in contact with no part of the oil shell during the process.

The network preferably includes at least 5 unit cells, and may have 10-200 unit cells. The supply of the network's reservoir may have an embedded electrode and an interface region with a unit cell, other than the first unit cell, for receiving the dispensed droplet. The boundary area may extend continuously over 2 adjacent walls bounding the first unit cell, or may extend continuously over a single wall bounding one side of the first unit cell.

Providing the network may involve providing a parallel plate unit cell structure with a ground electrode and an array of charging electrodes, where each charging electrode: faces the ground electrode from an opposite side of the unit cell; and is independently addressable of the charging electrodes of each of the adjacent unit cells.

The sensitive region may comprise an opening to a microfluidic channel, and the boundary may comprise a lip peripherally surrounding the opening. If so, delivering fluid to the first unit cell may involve back-flowing the fluid through the channel to cover at least the boundary.

Delivering fluid to the first unit cell may involve delivering at least one oil-free fluid droplet from the supply to the first unit cell via the network. DμF operations for delivering the oil-free fluid may be the same as those for delivering the OE droplet, if the process further comprises supplying oil to the content of the reservoir between deliveries of oil-free and OE droplets.

The network may further include a second supply adapted to discretize the oil-free fluid into droplets and move a droplet to one of the unit cells, and delivering the oil-free fluid to the first unit cell and the process further comprises delivering a discretized oil-free droplet from the one of the unit cells to the first unit cell via the network.

The sensitive region may be a surface of one of: a sensor; a treatment surface consisting of one of: a chemically reactive surface; a photochemically reactive surface; an electrochemically reactive surface; a thermochemically reactive surface; a microelectromechanical system (MEMS); and an acoustic, ultrasonic, infrasonic, optical, electromagnetic, electric or magnetic energy transfer surface. The covering fluid may be a calibration or reference sample particular to the sensor, treatment surface, or energy transfer surface. The liquid content may be aqueous.

Also accordingly, an OE DμF network is provided, the network including: a DμF space surrounded by a collection of electrodes defining at least 3 edge-connected unit cells, each unit cell having a volume for containing a droplet of fluid of volume less than 0.1 mL; a supply for the network adapted to discretize a substantially liquid content of a reservoir into OE droplets, by moving the OE droplets into one of the unit cells; a peripheral wall of the digital microfluidic space comprising a sensitive region, where the sensitive region lies entirely within the volume of a first of the unit cells; and a boundary extending continuously around the sensitive region, the boundary having a surface treatment providing a smaller contact angle for a droplet of fluid controllable by actuation the electrodes, than any other surface of the peripheral wall within the first unit cell away from the boundary and sensitive region, or any other unit cell. Once the sensitive region is exposed to a sufficient volume of fluid to cover the boundary and the sensitive region, and an OE droplet is merged with the fluid, part of a merged payload of the OE droplet and the fluid are anchored to the boundary, protecting the sensitive region from oil.

The surface treatment may provide a smaller contact angle for the droplet of fluid at the boundary when the electrode is not activated, than that of the first unit cell outside of the boundary when the electrode is activated with a voltage sufficient to enable displacement of the droplet of fluid. The surface treatment may provide a contact angle for the droplet of fluid at the boundary that is at least 10° lower than that of the first unit cell outside of the boundary when the electrode is activated with a voltage sufficient to enable displacement of the droplet of fluid.

The peripheral wall may include two meeting walls defining limits of the first unit cell in two directions, and the boundary extends continuously across segments of the two meeting walls.

The boundary area may extend continuously over the peripheral wall bounding one side of the first unit cell.

The sensitive region may be defined as with respect to the process.

Finally, an OE DμF network is provided, the network including: a digital microfluidic space surrounded by a collection of electrodes defining at least 3 edge-connected unit cells, each unit cell having a volume for containing a droplet of fluid of volume less than 0.1 mL; a supply for the network adapted to discretize a substantially liquid content of a reservoir into oil-encapsulated (OE) droplets, by moving the OE droplets into one of the unit cells; a peripheral wall of the digital microfluidic space comprising an opening to a microfluidic channel, where the opening lies entirely within the volume of a first of the unit cells; and an oil wicking material placed on the periphery wall at a distance of 0.5 to 2.5 times a mean dimension of the first unit cell from a centre of the cell. Excess oil shells from a sequence of OE droplets delivered to the first unit cell is captured by the oil wicking material.

A copy of the claims as filed is inserted herein by reference. Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which:

FIGS. 1-7 collectively showing a method for protecting a sensitive region from oil contamination;

DESCRIPTION OF PREFERRED EMBODIMENTS

A technique is described herein for supplying payload of an Oil-Encapsulated (OE) droplet in a digital microfluidic (DμF) network to a surface or opening (i.e. region) that is sensitive to oil contact. The OE-DμF network is naturally provided on a microfluidic chip.

All of FIGS. 1-7 are views of the same partial OE-DμF network, and can be understood with the following guidance: Each plan view shows a cross-section of the droplet through a middle of the droplet, and the droplets are presumed transparent. To simplify illustration, a contact edge where the droplet/oil shell meets the substrate, is not illustrated. Furthermore, electrodes, and structures buried under a top surface of a substrate (which are located under the hydrophobic coating) are shown in ghost view to assist the reader in making connections with the operative elements of respective unit cells. The side views are of a cross-section along a centre of the droplet, showing no features of the microfluidic device in the background, but showing, where visible, edge features of the droplets (i.e., droplets are also presumed transparent). The views are all substantially to plausible scale, except that the side view shows a spacing between substrate and cover lid that is approximately 10 times greater than it would be in a typical operational OE-DμF network: this enlargement affords a better view of the droplets. For schematic representation, electrodes in the side view are shown as "on" (electrically powered), if cross-hatched, and "off" (grounded), otherwise. While each image is of an identical OE-DμF network, some are unlabeled to afford a better view of the droplet in its pose.

Figure 1A:
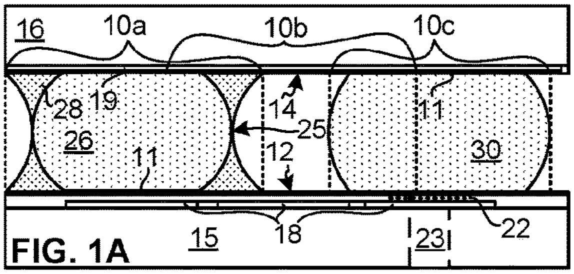
FIGS. 1A,B are schematic side and top plan illustrations of an example of a part of an OE-DμF network suitable for implementing the present invention.

FIGS. 1A,B are schematic partial side and top plan views, respectively, of a partial OE-DμF network. The OE-DμF network has 3 edge-connected unit cells 10*a,b,c*, each identified by a respective volume (shown with dotted lines) bounded above and below by surface coatings 11 on bottom 12 and top 14 surfaces, respectively supported by substrate 15 and cover lid 16. The surface coatings 11 ensure low adhesion of OE droplets to walls of the unit cell, and low friction for fast displacement. If the OE droplets have aqueous payloads, the surface coatings may be hydrophobic, and Teflon™ may be preferred as a low friction surface coating for a variety of DμF droplet compositions. A complete OE-DμF network would typically include at least one reservoir for retaining sample, as well as other reservoirs for buffer, reagents, etc., in preferably an oil-encapsulated manner or in an enclosed microfluidic chamber, and would typically include at least 8 unit cells. Many more than 8 unit cells may be provided, especially where a large number of OE-DμF processes are required concurrently. Some limited functionality OE-DμF networks may have as few as 4 or 5 unit cells 10.

Each unit cell is designed to hold a volume of liquid, referred to herein as a droplet. If the volume is too large, the droplet extends beyond a single unit cell's volume, and concerted actuation of two or more unit cells may pull the over-sized droplet apart, splitting it into two droplets, which may both be of suitable size for DμF operations. Splitting is a useful DμF operation. However if a droplet's volume decreases below a provisioned threshold, the sub-droplet may become stranded on a (part of) a unit cell, not properly occupying the unit cell, and thereafter may only be moved once another droplet merges with the sub-droplet, to form a droplet sized volume. The provisioned threshold is defined by properties of the unit cells, especially the dimensions of the electrode, and the spacing of the cover lid 16 from the substrate 15. The threshold is generally less than 0.1 mL. For example, reasonably sized droplet volumes are from 0.1 nL to 50 μL, more preferably from 1 nL to 1 μL, or 2 to 20 nL, nominal volume, and the acceptable tolerance on droplet size can be +/−0.6-60%.

Each unit cell 10 has a respective field effect displacement actuator ostensibly provided by an electrode 18, and a common ground electrode 19. The electrodes 18 are buried beneath an insulating layer. Preferably each unit cell's electrode 18 can be active when its adjacent unit cell 10 is not, to control droplet displacements, but to reduce electrical connections, some unit cells (usually distant) may be connected. Each unit cell is edge adjacent with at least one other unit cell 10, and the volumes of edge adjacent unit cells overlap, such that a field effect of edge adjacent unit cells 10 affect a respective part of the unit cell's volume. Overlap is frequently ensured by interleaving branches of the electrodes, for example as schematically illustrated or in a more symmetric interleaving.

Unit cell 10*c* has a sensitive region 20 (understood herein as sensitive to oil contamination), with a surface boundary 22 extending continuously around the sensitive region 20. The sensitive region 20, and preferably also the boundary 22, lies entirely within a volume of a single unit cell (i.e. unit cell 10*c* as shown), and may preferably be in a part of the volume 10*c* that overlaps the volume of no edge adjacent cell. The sensitive region 20 is illustrated as a circular surface surrounded by the annular boundary 22 on bottom surface 12, although neither shape nor symmetry is critical, and any wall or partition defining the unit cell 10*c* could alternatively be used, as long as the boundary 22 lies on a surface and surrounds the sensitive region 20 to provide for a sealing off of the sensitive region 20. The sensitive region 20 may be micro-, nano- or hybrid-scale structured and may be metallized to enhance surface plasmon resonance or other electromagnetic or photonic sensing capabilities, for example as taught in Applicant's patent application WO 2012/122628. As such, a waveguide 23 may be provided through the substrate 15 below the sensitive region 20. Alternatively, and equivalently for the detail of the drawing, the sensitive region 20 may be a microfluidic passage 23 through the substrate 15.

Figure 1B:
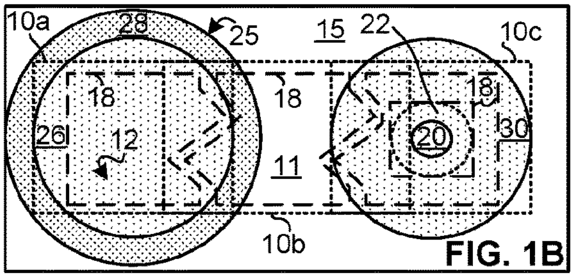

As the illustrated waveguide/passage 23 extends through the substrate 15, the electrode 18 of unit cell 10*c*, which is in ghost view of FIG. 1B as it is a buried electrode, is punctured. The waveguide/passage 23 may be provided by boring a through-hole of required diameter through a prepared OE-DμF network, guided by a dyed aqueous droplet retained on the unit cell 10*c* to produce the through-hole through substrate 15, the buried electrode 18, and the surface coating 11. A waveguide sensor may be inserted through the through-hole, such as an end of a fibre-optic waveguide with a suitably patterned top surface.

In an alternate embodiment, the ground electrode is punctured to provide waveguide/passage 23 through the cover lid 16. Furthermore the sensitive region 20 can be on a side wall of the unit cell, for example at an interface between the OE-DμF network and an analog (e.g. capillary- or pneumatically-driven) microfluidic network.

FIGS. 1A,B show a 3 unit cell segment of the OE-DμF network in a given state with two droplets: an OE droplet 25, and a covering liquid 30. While a payload 26 of the OE droplet 25 is shown substantially the same volume as the covering liquid 30, this is not necessary, and in particular it may be advantageous for the covering liquid 30 to be "over-sized", e.g. to reduce risk of accidental exposure of the sensitive region, or a sub-droplet as explained herein below. Alternatively, the non-OE droplet may be much smaller than the unit cell 10*c*, to limit its displacement when adjacent electrodes are activated. The OE droplet 25 and covering liquid 30 are shown in a rest state (deactivated electrodes), respectively in unit cells 10*a,c*. Unit cell 10*a* holds the OE-droplet 25 with its payload 26, surrounded by an oil shell 28. Unit cell 10*c* holds the covering liquid 30, which may have a same DμF droplet composition as the payload 26, or another composition that is miscible with the payload 26, non-miscible with the oil shell 28, and compatible with a sensor of the sensitive region 20 (if there is a specific sensor associated with the sensitive region 20). Preferably an arbitrary mixture of payload 26 and the covering liquid 30 is also a DμF droplet composition, whereby any droplet divided from a merger of these miscible fluids, can also be subjected to DμF operations. As electrodes 18 of the unit cells 10 are all off, both droplets are in a relaxed pose or "at rest". As a result, the contact angles of the oil-air-Teflon interfaces (i.e. angle between the limits of the oil bounded by air on one side and Teflon on the other) might be 30-50°, or about 40°, the payload-oil-Teflon interfaces might be 100-180°, or about 160-170°, and the payload-air-Teflon interfaces might be 100-140°, or about 120°. Static values (equilibrium) are readily discerned, but dynamic contact angles may vary.

In accordance with some aspects of the present invention, the boundary 22 is not covered by the surface coating 11, and preferably has a higher surface affinity for the OE droplet (i.e., if the payload is aqueous, it may be hydrophilic). There is typically more advantage to be gained by anchoring the covering liquid 30 to the boundary 22, than ensuring a fast and easy motion of a droplet across it. For example, if the boundary 22 has a contact angle with the payload of less than 90°, or less than, 80°, or 60°, (for example contact angles as low as 20° or even 10° have been demonstrated on some surfaces), the payload aqueous volume 30 will resist being pulled away from the boundary 22 under typical DμF operating conditions. Especially if the contact angle is low enough that at the operating voltages of the electrodes, the covering liquid 30 (and any mixture of the covering liquid 30 with payload) would be more likely to split than to separate from the boundary, it is said to be anchored. To achieve this, a contact angle of the boundary 22 is preferably lower than that of the remainder of the unit cell with the electrode activated, and preferably at least 10° lower than the aqueous volume 30 with the electrode off.

Apart from illustrating the OE-DμF network, FIGS. 1A,B serve to illustrate a first stage in a process of the present invention. Respectively, FIGS. 1-7 schematically illustrate seven stages in moving an OE-droplet 25 from unit cell 10*a* to merge it with the covering liquid 30 in unit cell 10*c*. From stage 1, the covering liquid 30 seals against boundary 22, covering and protecting the sensitive region 20. This seal is maintained throughout the 7 stages.

Accordingly a method for delivering an aqueous droplet to the sensitive region 20 is provided that avoids contaminating the sensitive region 20. This process would typically be repeated many times to supply a sample to a sensor, or sample treatment unit cell, as is known in the art. The repetition may deliver the sample as a stream of payloads 26 to the sensitive region 20. Unless the payloads 26 are consumed or removed from the OE-DμF network at the unit cell 10*c*, intermittent droplet removal from a merged droplet may be required, to limit a size of the merged liquid, and avoid dilution of the sample. If the sample is consumed or removed from the OE-DμF network at the unit cell 10*c*, an oil handling/removal system may be required to reduce an accumulated and thickened oil shell from multiple OE droplets.

FIGS. 1-7 demonstrate delivering OE-droplet 25 unit cell 10*a* to unit cell 10*c* via the OE-DμF network, and allowing the OE droplet to merge with the oil-free covering liquid 30 to produce a merged volume of the miscible payload and covering liquid, that is surrounded by oil 28 up to, and not including the boundary 22. The covering liquid 30 may have been provided to unit cell 10*c*, by DμF operations from a non-OE reservoir, or from a reservoir prior to oil encapsulation, or via a passage 23 to the unit cell 10*c*, or from other dispensing methods known in the art.

Figure 2A:
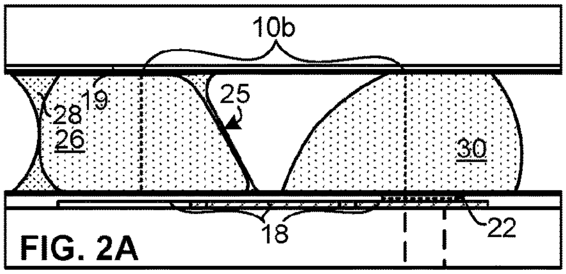
FIGS. 2A,B are schematic side and top plan illustrations of the OE-DμF network of FIG. 1 once two of the unit cells are activated.
Figure 2B:
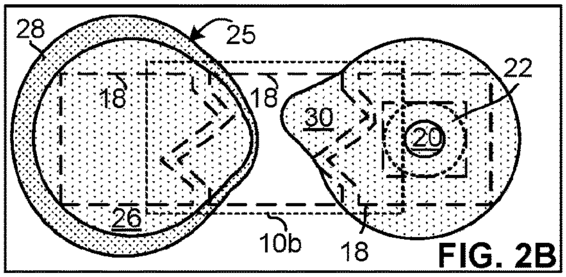
Figure 3A:
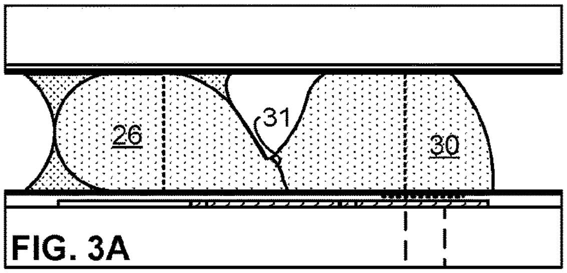
FIGS. 3A,B are schematic side and top plan illustrations of the OE-DμF network of FIG. 1 once aqueous contact is made.
Figure 4A:
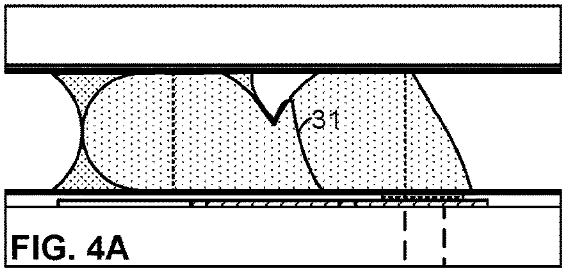
FIGS. 4A,B are schematic side and top plan illustrations of the OE-DμF network of FIG. 1 showing oil encapsulation spreading across a joined aqueous volume.
Figure 3B:
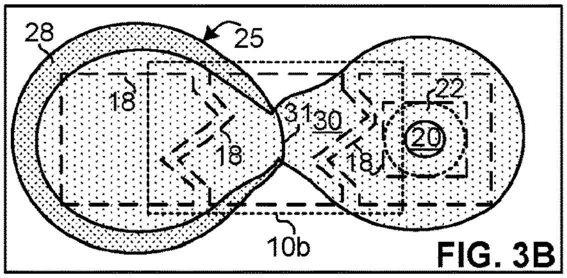
Figure 4B:
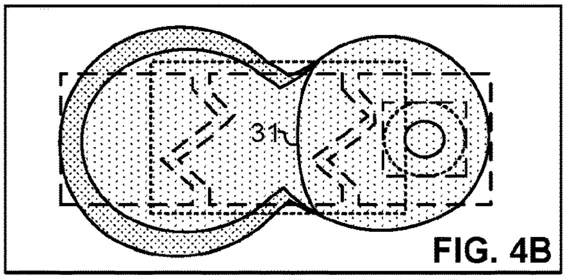
Figure 5A:
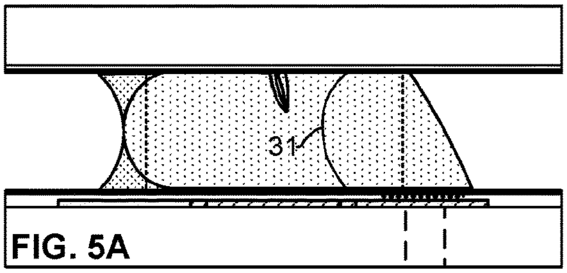
FIGS. 5A,6A are schematic side illustrations of the OE-DμF network of FIG. 1 showing oil encapsulation spreading across the joined aqueous volume.
Figure 7A:
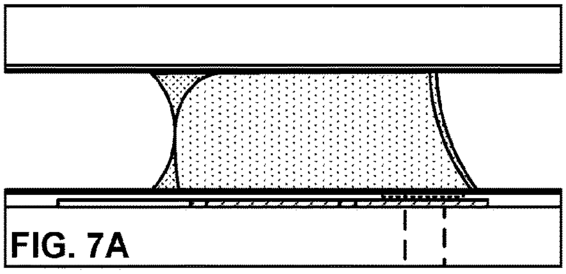
FIGS. 7A,B are schematic side and top plan illustrations of the OE-DμF network of FIG. 1 showing oil encapsulation of the joined aqueous volume.
Figure 6A:
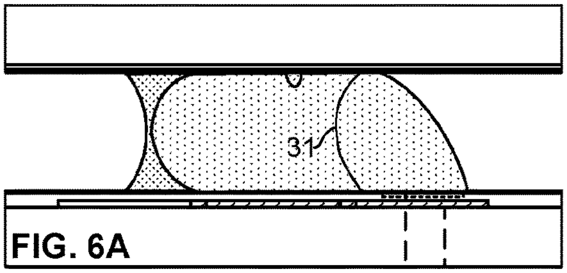
Figure 7B:
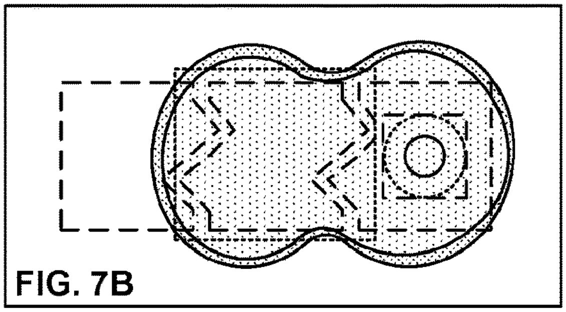

FIGS. 2A,B show a stage 2, which is what happens to the OE-DμF network of stage 1 after electrodes 18 of unit cells 10*b,c* are activated. As known in the art, the contact angle of the aqueous phase is reduced on the bottom substrate where the droplet is affected by the field effect actuator. This effect can be quite dramatic, resulting in activated payload-air-Teflon and payload-oil-Teflon interfaces with contact angles of 90-50°, or about 70°, without appreciably affecting oil-air-Teflon interfaces. To reduce visual clutter of the drawing, only unit cell volume 10*b* is shown in the remaining figures, and fewer features are identified by reference numeral. The OE-droplet begins to displace into the unit cell 10*b* as the volume 26 overlapping the field effect of 10*b*'s electrode 18 changes contact angle and draws more and more aqueous droplet into contact with the field effect. This tends to happen along the bottom edge first, as shown in FIG. 2A, and may be asymmetrically imbibed into unit cell 10*b* because of the electrode's shape (as shown in FIG. 2B). At the same time, the covering liquid 30 in unit cell 10*c* may be partially drawn into the unit cell 10*b*. As unit cell 10*a* is not activated, unlike unit cell 10*c*, displacement of the covering liquid 30 is smaller than that of liquid volume 26. Also, an operation voltage of the OE-DμF network may be chosen to be above a threshold for OE-droplet displacement, but under a threshold for displacing the (non-OE) covering liquid 30, in which case the covering liquid 30 would remain substantially still throughout the method.

The displacement continues while the electrodes 18 are activated, until the OE droplet 25 meets the covering liquid 30. From the moment of contact of the covering liquid 30 and OE-droplet 25, the oil shell 28 is repelled by the covering liquid and payload from both opposite surfaces, leading to a thinning, and eventual withdrawal of the oil shell 28 when payload and covering liquid 26,30 meet and join, as shown in stage 3. The displacement continues while the electrodes 18 are activated, and once the liquid volume 30 and OE droplet 25 meet over unit cell 10*b*, a payload-oil-air contact curve 31 is defined. The payload-oil-air contact curve 31 shows where the oil shell ends, but this is not to suggest that the droplet payload 26 and aqueous volume 30 aren't unified beneath this curve. The droplet and aqueous volumes 26,30 have merged and are continuing their dynamic deformation to a reduced surface energy configuration. The pierced oil shell 28 spreads quickly over the joining volumes 26/30 as is shown by advance of the payload-oil-air contact curve 31 shown at stages 3-5, and by stage 6, the oil shell encapsulates the merged aqueous liquid.

It will be noted that the motion of the covering liquid 30 is slower than that of the OE droplet 25, and the joining of the droplet liquid 26/30 proceeds mostly with the displacement of the payload 26 from unit cell 10*a* to 10*b*. As the contact began at stage 3, with meeting tips of the advancing payload 26, it progresses to thicken from stage 3 to 4. By stage 5, which is shown only in side elevation view, a space between the droplets 26/30 and the top surface 14 has nearly been filled. By stage 6, the space is filled, but a small part is a pocket of the oil shell 28, which likewise is displaced by stage 7. At stage 7 a merged droplet is formed, but is still deforming to its lowest surface energy configuration, which is a cylindrical disk with a surrounding oil encapsulation. If cell 10*b* is turned off prior to cell 10*c*, the droplet will further shift towards cell 10*c*. Once the merged droplet is formed, it will continue to deform into a disc-shape with a peripheral free surface dictated by contact angles.

While efforts have been made to illustrate the droplet deformations, it will be appreciated that several competing rates of advance are not precisely known, and the rates of advance of the curve 31 relative to the agglomeration of the aqueous merger is not presumed to be invariant of the specific oil encapsulation, size, operating voltage, or temperature. The rate at which the liquid 26/30 of the merged droplet advances to its final, substantially cylindrical disc shape, relative to the oil coating's advance over the liquid 26/30 is presented schematically.

An issue regarding the method is one of control. By selecting the operation voltage applied to the electrodes, one can speed-up or slow down droplet motions and other operations. By selecting slower droplet motions (at least for the final merging operation at the sensitive region), one can make the covering liquid 30 immobile throughout the process, as described hereinabove. Another alternative is to provide a different surface coating 11 with a higher affinity for the droplet at the boundary 22 (and optionally also the sensitive region 20, if that isn't an opening). If the boundary 22/coating 11/oil 28 has low contact angle, the unit cell 10*c* may be incapable of displacing the covering liquid 30 from the boundary 22. The boundary 22 may be the only part of the top 14 and bottom 12 surfaces treated for high surface affinity (low contact angle). Advantageously, if the boundary 22 has a low enough contact angle to ensure that the liquid would split before leaving the boundary 22, one is essentially assured that the sensitive region will not be exposed by any DμF operations. Accordingly, an embodiment of an invention is provided in a OE-DμF network having a boundary 22 around a sensitive region 20 in one or more walls defining a perimeter of a unit cell 10, where the boundary 20 is surface treated to have a lower contact angle for the fluid than any other part of the walls outside the boundary.

FIGS. 8-13 schematically illustrate various techniques for providing a protective covering liquid for a region of an OE-DμF network that is sensitive to oil contamination, as per stage 1, using variants of the embodiment of FIG. 1.

Figure 8:
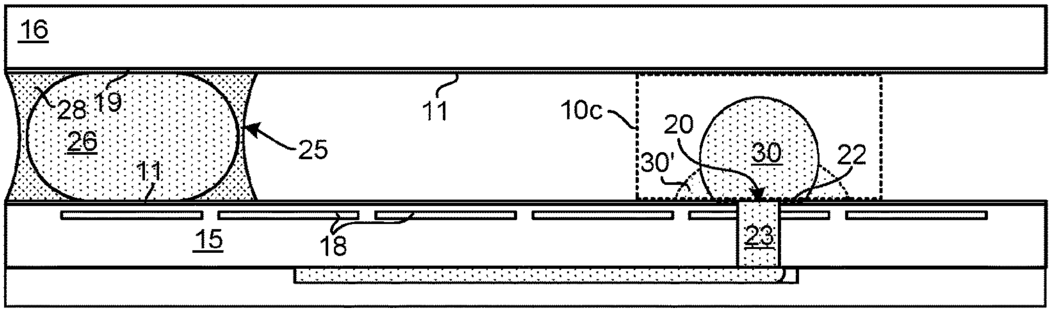
FIG. 8 is a schematic side illustration of a variant of the OE-DμF network of FIG. 1, in which a sensitive region is a microfluidic channel opening oriented through a substrate.
Figure 9A:
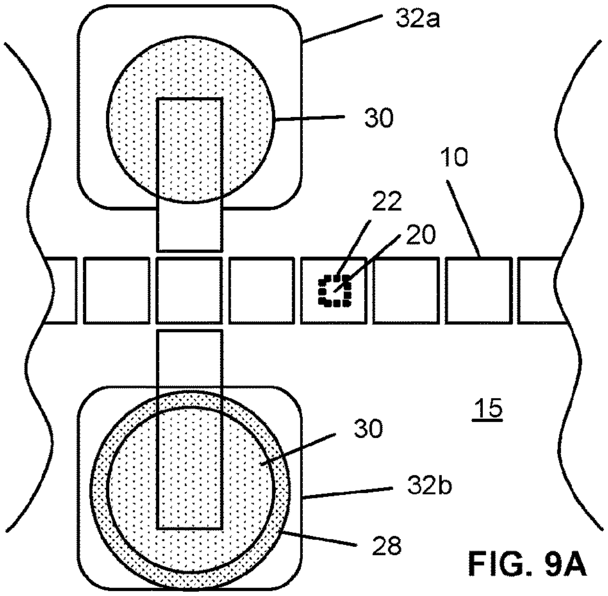
FIGS. 9A-G are schematic partial top plan illustrations of parts of an OE-DμF network having both oil encapsulated and oil free reservoirs, showing an expanded set of process steps useful for processing a sample.
Figure 9B:
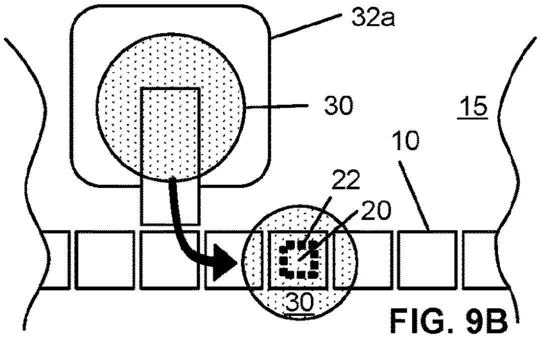
Figure 9C:
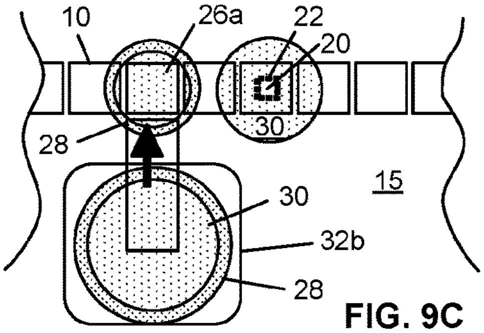
Figure 9D:
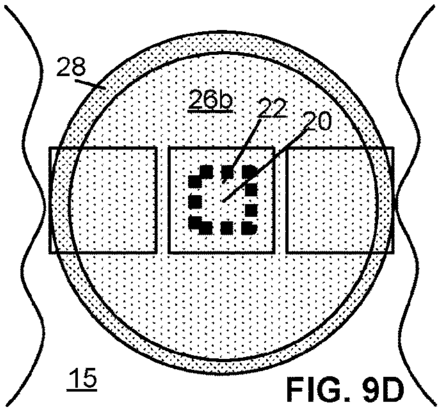
Figure 9E:
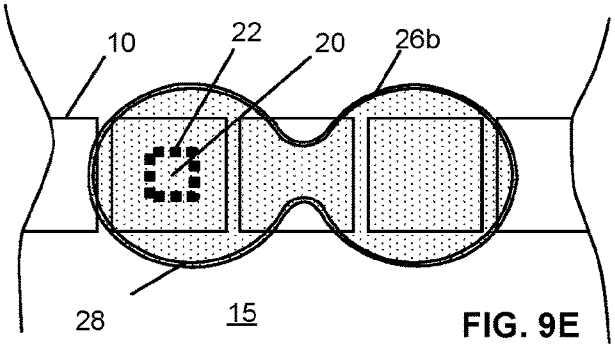
Figure 9F:
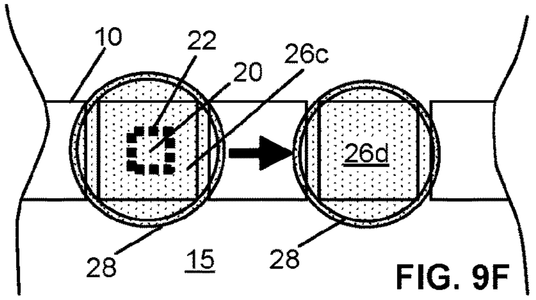
Figure 9G:
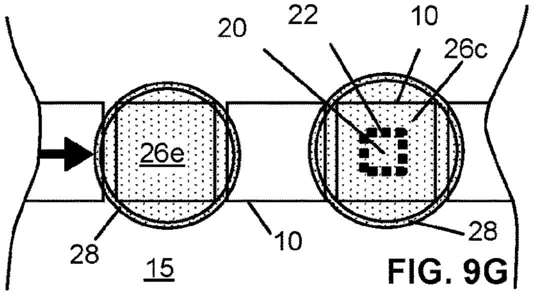

FIG. 8 shows a first variant of the embodiment of FIG. 1 in which there are 6 unit cells shown in the cross-section, side elevation view. Unit cell 10*c* is shown with covering liquid 30 covering the sensitive region 20, and the boundary 22 extending continuously around the sensitive region 20.

In this variant, the sensitive region 20 is a mouth of a microfluidic channel 23 that can be characterized as a through-bore or via that pierces the electrode and substrate 15, to communicate with a planar microfluidic structure the underlies the substrate 15. The substrate 15 may advantageously be formed of a plastic, such as a cyclic olefin, or a thermoplastic elastomer. FIG. 8 shows the covering liquid 30 in a low surface energy (rest or relaxed) configuration, when the corresponding electrode 18 is off, and also shows the covering liquid 30 at rest, when the corresponding electrode 18 is on (30'). It will be noted that the covering liquid 30 covers the sensitive region 20, and the boundary 22, even in the high surface tension state, but is smaller than a typical OE droplet, and is a sub-droplet, not movable by the OE-DμF network. The covering liquid 30 can be supplied through the channel 23, avoiding a requirement for any non-OE droplets to pass across the OE-DμF network.

In use, according to the present method the OE-droplet 25 is moved successively to unit cell 10*c*, where it merges with the covering liquid 30, allowing the oil shell to slide all around the merged droplet, without contacting or penetrating the boundary 22, and therefore without contaminating the sensitive region 20. At this juncture, the merged droplet will grow by the volume of the payload 26 of OE droplet 25. Some of the merged droplet may be retracted from the OE-DμF network through channel 23. It will be appreciated that sample can be injected as payloads into OE droplets 25 in unit cell 10*c* as well, by a reciprocal process.

If a series of OE droplets 25 are continuously supplied, with their payloads 26 extracted, an oil shell of the OE droplet 25 resident at unit cell 10*c* will thicken excessively. This can be addressed by: dividing the resident OE droplet 25, as each division will have an equal oil shell thickness, but this results in fewer samples being delivered through channel 23; or providing features that remove oil from a zone surrounding the boundary 22, for example on the cover lid 16 at a distance from the unit cell 10*c* where the oil shell would occupy if it is of excessive thickness. The microfluidic features may be a microfluidic channel and reservoir, or a porous mat or wicking body. These features are preferably oil-selective, to limit removal of payload.

FIGS. 9A-G are partial views of an OE-DμF network comprising two reservoirs 32*a,b*, in respective stages of a process for delivering payload 26*a* of an OE droplet to a sensitive region 20, without allowing an oil shell to contaminate the sensitive region 20. Each view is narrowed to a respective part of the OE-DμF network where an action is taking place, except FIG. 9A which shows all of the relevant part of the OE-DμF network on bottom 15. FIGS. 9A-G illustrate correspondingly numbered stages 1-7.

The first stage shows that reservoir 32*a* is non-OE reservoir, containing a covering liquid in an undivided volume larger than a droplet. Reservoir 32*b* is an OE reservoir, containing an aqueous volume 30 with an oil shell 28. Electrodes are shown partially underlying the reservoirs 32, permitting droplets of these aqueous volumes 30 to be dispensed into a unit cell 10 (while both happen to dispense into a common unit cell, this is not essential). At stage 2 a non-OE droplet of the covering liquid 30 is dispensed from the reservoir 32*a*, and delivered to a unit cell 10 with the sensitive region 20. At stage 3 reservoir 32*b* dispenses an OE droplet with payload 26*a*, bringing the OE-DμF network roughly into the stage 1 of FIG. 1. Stage 4 shows the merged OE droplet once it reaches its stable form, with a payload 26*b* comprising the mixture of the payload 26*a* and droplet 30, which would be the final state for the FIG. 1 droplet. Subsequent to the delivery of the payload 26*a* to the sensitive region 20, the OE droplet with payload 26*b* may be split into two OE droplets, with payloads 26*c,d*. Stages 5,6 show the splitting of the payload 26*b*. As the payload 26*a* and covering liquid 30 are miscible, each of payloads 26*c,d* are of equal likelihood composition. Payload 26*c* becomes resident to the unit cell 10 and protects the sensitive region 20 even when another OE droplet (with payload 26*e*) is delivered, which is shown approaching the sensitive region 20 in stage 7.

Figure 10A:
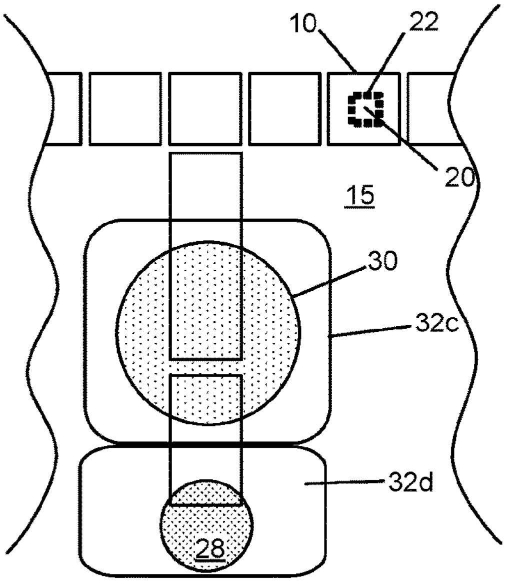
FIGS. 10A-C are schematic top plan illustrations of parts of an OE-DμF network with a hybrid oil encapsulated and oil free reservoir, showing an alternative set of process steps for bringing an OE-DμF network into a state of FIG. 1.
Figure 10B:
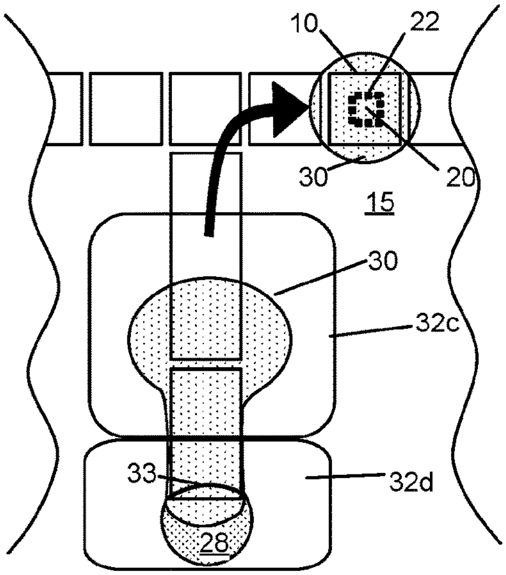
Figure 10C:
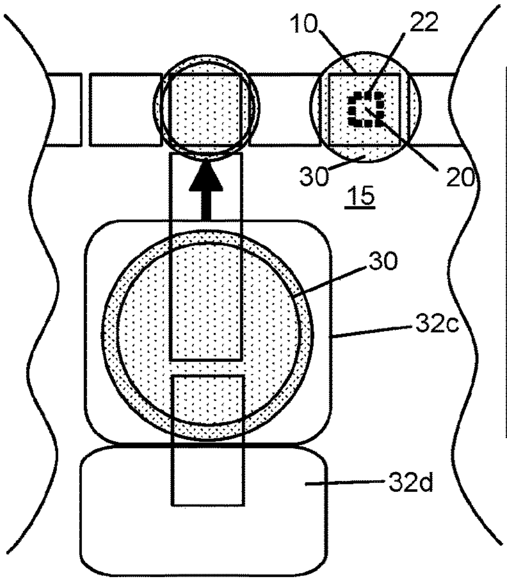

FIGS. 10A-C are partial views of an OE-DμF network comprising two reservoirs 32*c,d*, in respective stages (1-3) of a process for delivering payload 26*a* of an OE droplet 25 to a sensitive region 20, without allowing an oil shell 28 to contaminate the sensitive region 20. In stage 1 the covering liquid 30 is resident in a hybrid reservoir 32*c,d*, and is kept separate from an oil droplet 28. Thus in stage 2 when a droplet is dispensed from the hybrid reservoir 32*c,d*, and delivered to the unit cell 1—with the sensitive region 20, the droplet is unencapsulated. If there are several unit cells 10 in the OE-DμF network (not in view) that have respective sensitive regions 20, the process is repeated for each. If the only path from the reservoir 32*c,d* to the other such unit cells pass through the illustrated unit cell 10, the droplets merge and split passing through the illustrated unit cell 10. In stage 2 the covering liquid 30 is also shown moving into reservoir 32*d*, and contacting oil 28 therein. The oil, displaced by the covering liquid 30 draws the oil over droplet, forming an oil shell 28 on the covering liquid 30. Thus, by stage 3, a process of dispensing a droplet produces an OE droplet 25, bringing the process into stage 1 of FIG. 1.

FIGS. 11A-D are partial views of an OE-DμF network with a differently formed unit cell 10*d*, in respective stages (1-4) of a process for delivering payload 26*a* of an OE droplet to a sensitive region 20, without contamination risk from an oil shell 28 of the OE droplet. Each view is narrowed to a respective part of the OE-DμF network where an action is taking place, except FIG. 11A which shows, in isometric view, all of the relevant part of the OE-DμF network.

Figure 11A:
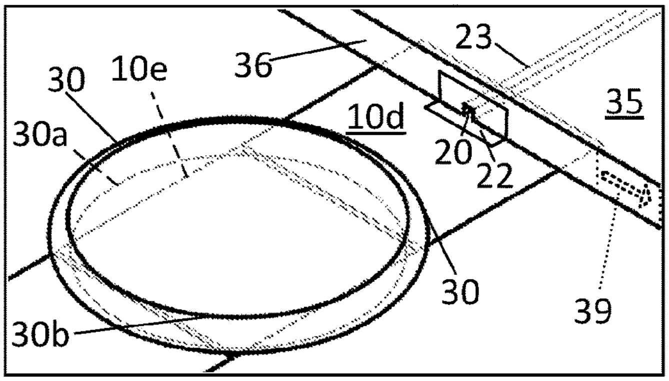
FIGS. 11A-D are isometric and partial top plan views of parts of an OE-DμF network in which the sensitive region is defined as an opening to a microfluidic channel extending parallel to a plane of the OE-DμF network, providing an oil-protected interface between an OE-DμF network, and an analog microfluidic network.
Figure 11B:
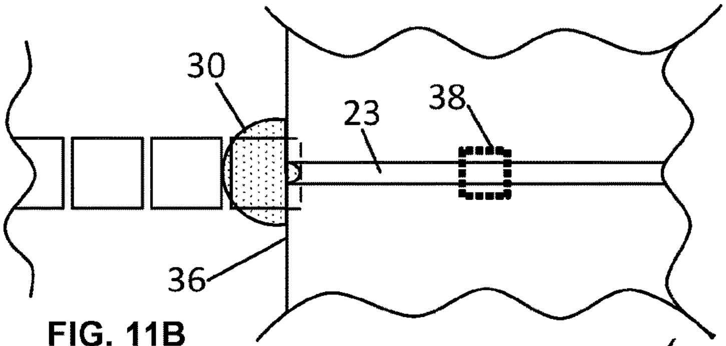
Figure 11C:
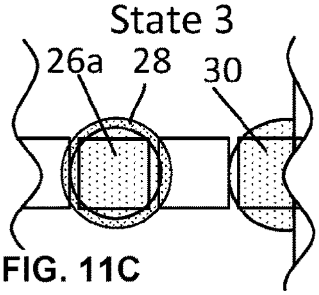
Figure 11D:
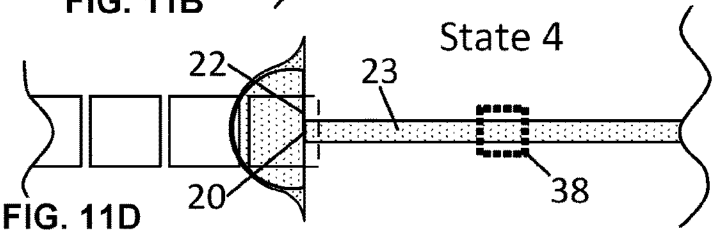

FIG. 11A shows two complete adjacent unit cells 10 the OE-DμF network. Unit cell 10*d* is defined at an edge of an OE-DμF network, where it borders a controlled analog network along wall 36. The bordering is via a microfluidic channel 23 extending through the wall 36, which may be capillary-based with a controlled valve, electroosmotically controlled, or pneumatically controlled, for example. A mouth of the microfluidic channel 23 is the sensitive region 20. No oil contamination is sought to be entrained into the microfluidic channel 23. The microfluidic channel 23 may optionally include a sensor surface 38, or fluid treatment region 38 that is sensitive to oil residue (shown in FIGS. 11B,D). As such, boundary 22 is composed of two segments, one on a bottom 15 of the OE-DμF surface, and the other on the wall 36. The channel 23 is shown centered on the electrode 10*d*, although this is not essential, and as long as the entire boundary 22 is within a volume of the unit cell 10*d*, it is sufficient for present purposes. FIG. 11A shows a droplet of covering fluid 30 in unit cell 10*e*, which is adjacent to unit cell 10*d*. In the isometric view, a bottom contact edge 30*a* can be shown in ghost view, as well as the top contact edge 30*b*, and an arcuate curve between these contact edges can be seen. One final feature in view in FIG. 11A is an oil wick 39, which is strategically positioned on wall 36 to wick oil away from a resident droplet, to address in a passive manner, the issue of oil accumulation if many OE droplets are supplied in sequence. The rest of the FIG. 11 show top plan views.

In state 2 the covering liquid 30 is moved to unit cell 10*d*, and seals against the boundary 22. By state 3 an OE droplet with a payload 26*a* approaches unit cell 10*e*. Whether the covering liquid 30 is partially imbibed into the channel 23 before the merge with OE droplet 25 or not, by state 4 an oil encapsulation 28 is provided around the merged covering liquid/payload 30/26*a*, and the visible channel 23 is filled.

Figure 12A:
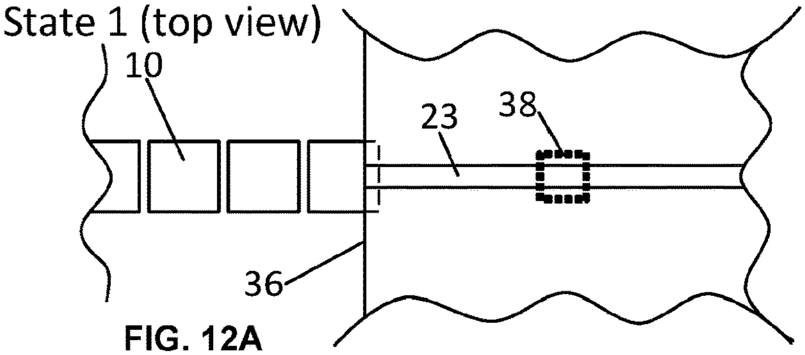
FIGS. 12A,B are respective top plan views of parts of the OE-DμF network of FIG. 11, showing oil free aqueous volume introduced via an analog microfluidic network.
Figure 12B:
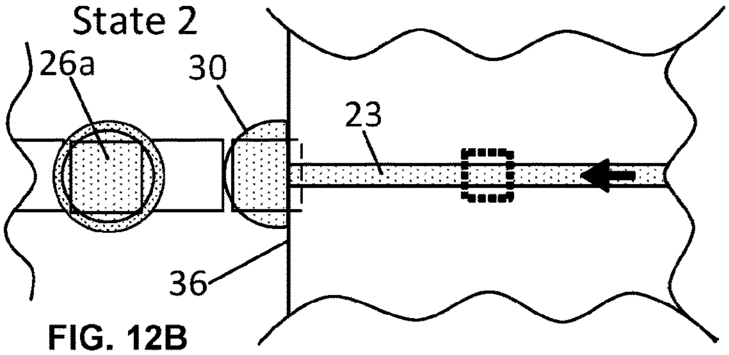

FIGS. 12A,B schematically illustrate an alternative means for achieving state 2 of FIG. 11: by backflowing the covering liquid 30 through the microfluidic channel 23. Thus state 4 can be achieved by merging OE droplet with payload 26*a*, without a requirement to supply any non-OE droplet through the OE-DμF network.

Figure 13A:
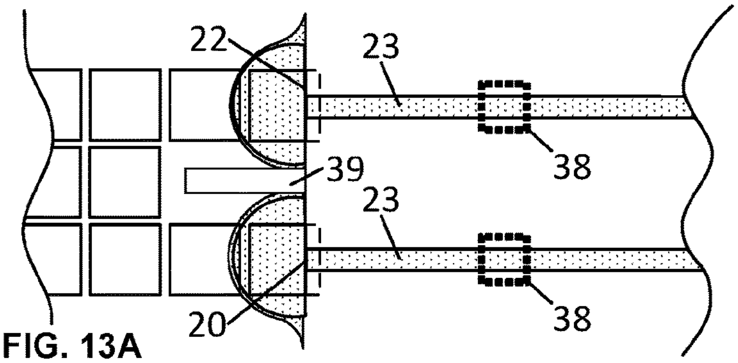
FIG. 13A is a top plan view of part of an OE-DμF network having two interface channels with the analog microfluidic network, and a common oil getter material.
Figure 13B:
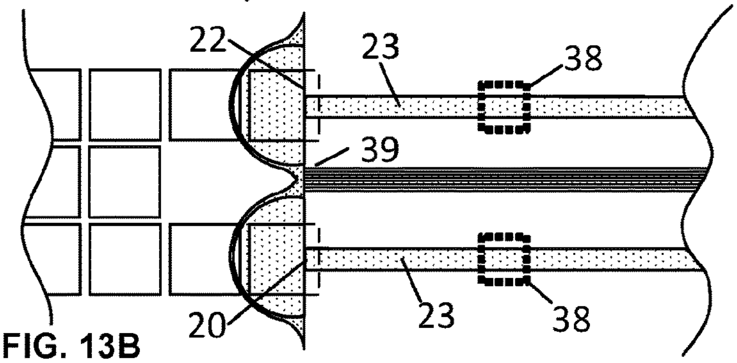
FIG. 13B is a top plan view of part of an OE-DμF network having two interface channels with the analog microfluidic network and an oil removal system that draws oil into the analog microfluidic network for analysis or disposal, keeping aqueous and oil separated.
Figure 13C:
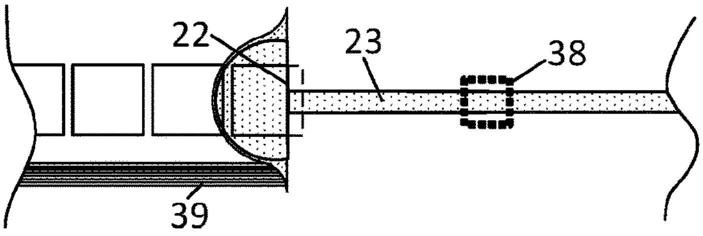
FIG. 13C is a top plan view of part of an OE-DμF network having an oil removal system that recirculates or collects oil collected from successive OE-droplets.

FIGS. 13A-C schematically illustrate 3 embodiments of oil wicking structures 39 that can be used in the present invention. In FIG. 13A a block of wicking material 39 is placed between two boundary unit cells 10*d* to absorb excess oil from both. It will be appreciated that it may take dozens of payload 26 deliveries before the oil shell 28 at the resident OE droplet thickens appreciably, and removal of a small volume of oil shell 28 may be all that is required to ensure efficient operations. FIG. 13B shows a plurality of oil selective micron scale or smaller channels 39 for extracting oil from the resident OE droplet. A single microfluidic chip may have parallel and distinct processing networks for both oil and payload fluids from the OE-DμF network. The chip may also aliment the OE-DμF network with OE droplets by working in an opposite direction, avoiding a requirement to load the reservoirs. FIG. 13C shows that the oil channels 39 may direct the oil, for example by a self-wicking process, to an oil reservoir, such as reservoir 32*d* of FIG. 10, whereby oil can be recycled on the OE-DμF network.

Having thus described examples of the method, and apparatus of the present invention, those skilled in the art are now able to protect sensitive region of DμF networks from oil streak and contamination, while enabling OE-DμF processing. The embodiments are described herein illustratively and are not meant to limit the scope of the invention as claimed. Variations of the foregoing embodiments evident to a person of ordinary skill are intended by the inventor to be encompassed by the following claims.

The invention claimed is:

1. A process for supplying a payload of an oil-encapsulated (OE) droplet within a digital microfluidic (DμF) network to a spatial region (SR) that is desirably not brought into contact with oil, the process comprising:

a) providing a DμF network of:
   i. at least 3 edge-connected unit cells, each unit cell having; a volume for containing a droplet of fluid of volume less than 0.1 mL; and an electrode for field-effect displacement of an OE droplet from a neighbouring unit cell; and
   ii. a supply for the network adapted to discretize a substantially liquid content of a reservoir into OE droplets, by moving the OE droplets into one of the unit cells, by actuation of an electrode of the network;
   where the SR lies entirely within the volume of a first of the unit cells, the SR surrounded by a boundary extending continuously around it;
b) delivering to the first unit cell sufficient oil-free fluid to cover and seal off the boundary, covering the SR, the fluid being miscible with the payload; and, while the oil-free fluid seals the boundary, c) delivering at least one OE droplet from the supply to the first unit cell via the network, and allowing the OE droplet to merge with the oil-free fluid to produce a merged droplet that is surrounded by oil up to, and not including the boundary;

whereby the SR is in contact with no part of the oil shell during the process.

2. The process of claim 1 where the network's unit cells comprise at least 5 unit cells.

3. The process of claim 1 where the supply of the network comprises the reservoir with an embedded electrode interfacing with a second of the unit cells, other than the first unit cell, for receiving the dispensed droplet.

4. The process of claim 1 where the boundary area extends continuously over 2 adjacent walls bounding the first unit cell.

5. The process of claim 1 where the boundary area extends continuously over a single wall bounding one side of the first unit cell.

6. The process of claim 1 wherein providing the network comprises providing a parallel plate unit cell structure with a ground electrode and an array of charging electrodes, where each charging electrode: faces the ground electrode from an opposite side of the unit cell; and is independently addressable of the charging electrodes of each of the adjacent unit cells.

7. The process of claim 1 wherein the SR comprises an opening to a microfluidic channel, and the boundary comprises a lip peripherally surrounding the opening.

8. The process of claim 7 wherein delivering fluid to the first unit cell comprises back-flowing the fluid through the microfluidic channel to cover at least the boundary.

9. The process of claim 1 wherein delivering fluid to the first unit cell comprises delivering at least one oil-free fluid droplet from the supply to the first unit cell via the network.

10. The process of claim 9 wherein DμF operations for delivering the oil-free fluid are the same as those for delivering the OE droplet, and the process further comprises supplying oil to the content of the reservoir between b) and c).

11. The process of claim 1 wherein the network further comprises a second supply adapted to discretize the oil-free fluid into droplets and move a droplet to one of the unit cells, and delivering the oil-free fluid to the first unit cell and the process further comprises delivering a discretized oil-free droplet from the one of the unit cells to the first unit cell via the network.

12. The process of claim 1 wherein the SR comprises a surface of one of:

a sensor;

a reactive surface consisting of one of: a chemically reactive surface; a photochemically reactive surface; an electrochemically reactive surface; a thermochemically reactive surface;

a microelectromechanical system (MEMS); and an acoustic, ultrasonic, infrasonic, optical, electromagnetic, electric or magnetic energy transfer surface.

13. The process of claim 12 wherein the fluid comprises a calibration or reference sample particular to the sensor; treatment surface; or energy transfer surface.

14. The process of claim 1 wherein the liquid content is aqueous.

15. An oil-encapsulated (OE) digital microfluidic (DμF) network comprising:

a DμF space including at least 3 edge-connected unit cells, each unit cell having; a volume for containing a droplet of fluid of volume less than 0.1 mL; and an electrode for field-effect displacement of an OE droplet from a neighbouring unit cell;

a supply for the network adapted to discretize a substantially liquid content of a reservoir into OE droplets, by moving the OE droplets into one of the unit cells, by actuation of at least the one of the unit cell's electrode;

a peripheral wall of the digital microfluidic space comprising a spatial region (SR), where the SR lies entirely within the volume of a first of the unit cells; and a boundary extending continuously around the SR, the boundary having a surface treatment providing a smaller contact angle than any other surface of the peripheral wall within the first unit cell away from the boundary, or any other unit cell, whereby once the SR is exposed to a sufficient volume of fluid to cover the boundary and the SR, and an OE droplet is merged with the fluid, part of a merged payload of the OE droplet and the fluid are anchored to the boundary, protecting the SR from oil.

16. The OE-DμF network of claim 15 wherein the surface treatment provides a smaller contact angle for the droplet of fluid at the boundary when the first unit cell's electrode is not activated, than that of the first unit cell outside of the boundary when the first unit cell's electrode is activated with a voltage sufficient to enable displacement of the droplet of fluid.

17. The OE-DμF network of claim 15 wherein the surface treatment provides a contact angle for the droplet of fluid at the boundary that is at least 10° lower than that of the first unit cell outside of the boundary when the first unit cell's electrode is activated with a voltage sufficient to enable displacement of the droplet of fluid.

18. The OE-DμF network of claim 15 where the peripheral wall comprises two meeting walls defining limits of the first unit cell in two directions, and the boundary extends continuously across segments of the two meeting walls; or the boundary area extends continuously over the peripheral wall bounding one side of the first unit cell.

19. The OE-DμF network of claim 15, where the SR is:

a sensor;

a reactive surface consisting of one of: a chemically reactive surface; a photochemically reactive surface; an electrochemically reactive surface; and a thermochemically reactive surface;

a microelectromechanical system (MEMS);

an acoustic, ultrasonic, infrasonic, optical, electromagnetic, electric or magnetic energy transfer surface; or an opening to a microfluidic channel.

20. An oil-encapsulated (OE) digital microfluidic (DμF) network comprising:

a digital microfluidic space including at least 3 edge-connected unit cells, each unit cell having; a volume for containing a droplet of fluid of volume less than 0.1 mL; and an electrode for field-effect displacement of an OE droplet from a neighbouring unit cell;

a supply for the network adapted to discretize a substantially liquid content of a reservoir into oil-encapsulated (OE) droplets, by moving the OE droplets into one of the unit cells, by actuation of at least the one of the unit cell's electrode;

a peripheral wall of the digital microfluidic space comprising an opening to a microfluidic channel, where the opening lies entirely within the volume of a first of the unit cells; and an oil wicking material placed on the peripheral wall at a distance of 0.5 to 2.5 times a mean dimension of the first unit cell from a centre of the cell, whereby excess oil shells from a sequence of OE droplets delivered to the first unit cell is captured by the oil wicking material.

* * * * *